(12) United States Patent
Van Ackere et al.

(10) Patent No.: US 7,624,429 B2
(45) Date of Patent: Nov. 24, 2009

(54) METHOD, A NETWORK ACCESS SERVER, AN AUTHENTICATION-AUTHORIZATION-AND-ACCOUNTING SERVER, AND A COMPUTER SOFTWARE PRODUCT FOR PROXYING USER AUTHENTICATION-AUTHORIZATION-AND-ACCOUNTING MESSAGES VIA A NETWORK ACCESS SERVER

(75) Inventors: Michel Van Ackere, Sint-Niklaas (BE); Stéphane Focant, Schaerbeek (BE)

(73) Assignee: Alcatel, Paris (FR)

( * ) Notice: Subject to any disclaimer, the term of this patent is extended or adjusted under 35 U.S.C. 154(b) by 813 days.

(21) Appl. No.: 10/440,239

(22) Filed: May 19, 2003

(65) Prior Publication Data
US 2003/0233572 A1 Dec. 18, 2003

(30) Foreign Application Priority Data
Jun. 4, 2002 (EP) .................................. 02360161

(51) Int. Cl.
G06F 7/04 (2006.01)
G06F 17/00 (2006.01)
(52) U.S. Cl. .................... 726/3; 726/4; 726/12; 726/15
(58) Field of Classification Search ................. 709/227, 709/229, 228
See application file for complete search history.

(56) References Cited

U.S. PATENT DOCUMENTS 6,263,369 B1 7/2001 Sitaraman et al.

(Continued)

FOREIGN PATENT DOCUMENTS

EP 1104142 A1 * 5/2001

(Continued)

OTHER PUBLICATIONS

RFC 2903 (Aug. 2000).*

(Continued)

*Primary Examiner*—Benjamin E Lanier
(74) *Attorney, Agent, or Firm*—Sughrue Mion, PLLC

(57) ABSTRACT

The invention relates to providing network access to separate virtual private network. It relates to a method for proxying user authentication-authorization-and-accounting messages via a network access server (NAS) and at least two separated virtual private networks (VPNs), wherein a first VPN has it's own first authentication-authorization-and-accounting server (AAA server), and a second VPN has it's own second AAA server, comprising the steps of:

said NAS D2 invokes (2) said first AAA server D7 for a user authentication-authorization-and-accounting and when said first AAA server D7 is not responsible for the user authentication-authorization-and-accounting, said first AAA server D7 partly steers the NAS D2 operation and identifying a configuration for a responsible second AAA server D8, if this information is available and if no information is available, forcing said NAS D2 to select or identify a configuration for the responsible second AAA server D8 and said NAS D2 invokes said second AAA server D8, based on the said configuration, and this second AAA server D8 performs a real user authentication-authorization-and-accounting and a decisive steering of the NAS operation (5).

Further it relates to a network access server, an authentication-authorization-and-accounting server, and computer software products for proxying user authentication-authorization-and-accounting messages via a network access server.

12 Claims, 3 Drawing Sheets

U.S. PATENT DOCUMENTS

| | | | |
|---|---|---|---|
| 6,298,383 B1 | 10/2001 | Gutman et al. | |
| 6,895,434 B1 * | 5/2005 | Chandrupatla et al. | 709/223 |
| 6,915,345 B1 * | 7/2005 | Tummala et al. | 709/225 |
| 7,023,879 B1 * | 4/2006 | Sitaraman et al. | 370/466 |
| 2001/0044893 A1 | 11/2001 | Skemer | |

FOREIGN PATENT DOCUMENTS

| | | | |
|---|---|---|---|
| EP | 1 176 781 A2 | 1/2002 | |
| EP | 1357720 A1 * | 10/2003 | |
| WO | WO 99/29095 A1 | 6/1999 | |
| WO | WO 01/31855 A2 | 5/2001 | |

OTHER PUBLICATIONS

Gleeson B. et al., RFC 2764—A Framework for IP Based Virtual Private Networks, Feb. 2000, Networking Group, pp. 6-9.*

* cited by examiner

METHOD, A NETWORK ACCESS SERVER, AN AUTHENTICATION-AUTHORIZATION-AND-ACCOUNTING SERVER, AND A COMPUTER SOFTWARE PRODUCT FOR PROXYING USER AUTHENTICATION-AUTHORIZATION-AND-ACCOUNTING MESSAGES VIA A NETWORK ACCESS SERVER

BACKGROUND OF THE INVENTION

Field of the Invention

The present invention relates to providing network access to at least one virtual private network. More particularly, the present invention relates to methods, a network access server, an authentication-authorization-and-accounting server, and computer software products for proxying user authentication-authorization-and-accounting messages via a network access server.

The invention is based on a priority application EP 02 360 161.0, which is hereby incorporated by reference.

Background

Internet Service Providers (ISPs) and telephone companies (Telcos) typically offer wholesale Internet access and retail Internet access to their subscribers. Wholesale access is typically offered to subsidiary and specialized service providers, competitive local exchange carriers, corporations, and community of interest providers.

Subscriber information for individual wholesale subscribers/users is usually stored by those who lease communications network access from the ISP or Telco. Hence, corporations, competitive local exchange carriers, and community of interest providers do not normally share their subscriber/user information with the wholesale providers. The ISP or Telco, however, typically also has its own retail subscribers whose subscriber/user information is stored in its databases. Hence, the ISP or Telco should identify an incoming subscriber/user as a wholesale user or a retail user and initiate different actions for an incoming user based upon this status.

A pure retail environment has a number of network access servers (NAS) A2, illustrated in FIG. 1, that provide data communications portals to the ISP's point of presence (PoP) on the data communications network A3. Each NAS A2 is in communication with a conventional authentication-authorization-and-accounting service (AAA service) A4 maintained by the ISP. Incoming users connect to the NASes by dialing in over a telephone network or in another conventional manner.

Network Access Procedure

In order to gain access to a computer network A3, such as the World-Wide-Web, or the Internet, or a private intranet network, a user will first dial-in or otherwise connect to an NAS A2. The NAS serves as a gate between the computer network and the user. As a threshold matter, the NAS A2 has to authenticate the identity of the subscriber in order to ascertain the nature and scope of the services that it will provide. Of course, if the network is differentiated into public areas that are accessible to all subscribers generally, and private areas that are accessible only to authorized subscribers, then the user's identity is particularly important.

Authentication-authorization-and-accounting in the networking context is a system and method to control what computer resources users have access to and to keep track of the activity of users over a network. Authentication is the process of identifying an individual, usually based on a username and password. Authentication is based on the idea that each individual user will have unique information that sets him or her apart from other users. Authorization is the process of granting or denying a user access to network resources once the user has been authenticated through the username and password. The amount of information and the amount of services the user has access to depend on the user's authorization level. Accounting is the process of keeping track of a user's activity while accessing the network resources, including the amount of time spent in the network, the services accessed while there and the amount of data transferred during the session. Accounting data is used for trend analysis, capacity planning, billing, auditing and cost allocation. AAA services often require a server that is dedicated to providing the three services. In this description the term authentication-authorization-and-accounting is used for the authentication procedure, the authorization procedure, or the accounting procedure. Note that the three procedures do not need to occur together mandatory.

The authentication procedure generally involves such servers, herein referred to as an authentication-authorization-and-accounting Server (AAA server) A4, as illustrated in FIG. 1. The NAS A2 is a client of the AAA Server, which may serve several client NASes simultaneously. The NAS and the AAA Server A4 communicate with one another according to a standard Internet protocol, such as the Remote Authentication Dial-In User Service (RADIUS) protocol, developed by Livingston Enterprises of Pleasanton, Calif. The description of the authentication procedure that follows is based on the RADIUS protocol, although not restricted to any specific protocol.

Typically, the user begins his or her session on the network by first launching a dial-in application on his or her personal computer or terminal A1 that prompts the user to enter some form of user identification, like a user-name, and a private password. Such information may also be stored on and automatically provided by the PC. The dial-in application contacts an NAS A2, for instance, via modem and telephone line, and provides the NAS with the user-entered information. The password data are usually encrypted using methods well-known to those of ordinary skill in the art. The NAS A2 then prepares and sends an "access-request" packet to the AAA Server A4. The access request packet contains the data entered by the user, as well as additional data identifying the particular NAS client from which the packet was sent.

The AAA Server A4 contains (or has access to) a database of information on the accounts of each subscriber, including user-names, encrypted passwords and configuration information detailing the type of service that is to be provided to each user. When the AAA Server A4 receives an access-request packet from an authorized NAS client, it consults its database of subscribers to find the account entry for the user identified by the information contained in the access-request packet. The account entry will often specify certain requirements that must be met in order for the user to gain access to the network, including information on the clients and ports on the network, which the user is allowed to access. If the passwords match, and all the other requirements are met, then the AAA Server A4 sends the NAS A2 an "access-accept" packet in response. The access-accept packet contains configuration data that enable the NAS A2 to provide the desired service to the user.

If any requirement is not met, then the AAA Server A4 responds with an "access-reject" packet indicating that the user request is invalid. The access-reject packet may also contain text messages that may be delivered to the user by the NAS A2. Even if all the requirements are met, the AAA Server A4 may still deny immediate access to the user and instead issue an "access-challenge" packet that prompts the user for new information before access is finally granted.

In order for the user to communicate with the network, the user should be assigned an IP address. User IP addresses are usually assigned dynamically, meaning that a user's IP address can change from session to session. The IP address can be assigned either by the AAA Server A4, or by the NAS A2. Once an IP address has been assigned to the user, the user is logged-on to the NAS and can begin his or her session on the network. After logging the user on, the NAS sends an "accounting-start" packet to the AAA Server A4, containing information regarding, for instance, the time at which the user's session begins, or other administrative and accounting data, that can be stored in the AAA Server's database.

Distributed Network Access Procedure

As described in U.S. Pat. No. 6,298,383 ISPs and Roaming Service Providers offer network access through a technique called "Authentication proxying." Proxying involves the transfer of the Authentication responsibility to the "owner" of the subscriber. Thus, if a corporation was to outsource its corporate intranet to an ISP, what it gives up is the maintenance of its dial-up servers (i.e., the NASes). It does not, however, normally want to give up the control or information of its employees. Hence, when a corporate user dials in to such an ISP's network access server, the user essentially perceives that he or she is dialing into a corporate facility while he or she is actually dialing into the ISP's domain and then somehow gaining admittance to the corporation's intranet.

A distributed architecture for providing network access to a communications system by locally authenticating and authorizing access requests is described in U.S. Pat. No. 6,263,369.

What really happens in that scenario is that the ISP determines that the user belongs to a virtual private network (VPN) by parsing either the fully qualified domain name (FQDN) supplied by the user, a Dialed Number Information Service (DNIS) ID, or some other mechanism, illustrated in FIG. 2. Having determined that the user trying to gain access belongs to a dedicated VPN, the ISP cannot really authenticate the user. Hence, the ISP will "proxy" out the authentication transaction to the corporation. An AAA service within the corporation then identifies the user, verifies the password, and provisions the user. Then the AAA server notifies the ISP's proxy server that the user is acceptable and passes along provisioning details associated with the user. The ISP then grants the user access to the network based upon the reply it gets back from the corporation. This technique is called "proxying."

Accordingly, it would be desirable to provide a capability for allowing ISPs and Telcos to seamlessly offer wholesale and retail communications network access, unify the disparate systems that specialize in these access control segments and scale both systems to simultaneously reside on a plurality of PoPs while behaving in a distributed manner within the communications network.

Private Networks

A significant concern of the individual private and public domains making up the Internet or any other system incorporating multiple networks is the ability to insure that only those users who are authorized to access the individual private and public domains within the comprehensive network have the capability to access such networks. Serious security risks are posed by the possibility of unauthorized users having the know-how and capability to invade the individual private and public domains within the network.

In today's networking environment, many privately owned domain sites exist that allow access only to those individuals that have been granted the proper authorization. For example, these may include company owned private domains containing confidential information and, as such, the company may grant access only to those employed by the company, or they may be communities of interest (i.e. "pay-sites") that provide information only to those users who subscribe to the privately owned domain. The user who connects to the Internet, typically by means of an ISP or Telco, may also possess the capability to make numerous concurrent connections to these privately owned and "secure" domain sites.

When external authentication is used in current network access server scenarios, the NAS directly performs its operation based on the information that is returned from the external authentication-authorization-and-accounting server. This requires that the addressed AAA server C7 should be capable of returning the necessary information to the NAS C2, i.e. at least a network connection, illustrated in FIG. 3. But the addressed AAA server C7 need not always be the one that is the real responsible for authenticating a user who requests a connection set-up. In that case, currently, the addressed AAA server C7 proxies the connection set-up request information to the responsible AAA server C8, which returns the necessary information to it for forwarding to the NAS C2.

As long as the addressed AAA server C7 and the responsible AAA server C8 are in the same administrative domain, i.e., connected, this technical solution is appropriate. However, when the addressed AAA server and the responsible AAA server are in different (competitive) administrative domains, which will indeed be the case in many NAS scenarios, the network connection between the AAA servers (in whatever form) that is required to exchange information between them may not be justifiable on a business level or for security and privacy reasons.

Therefore, there should be a way to forward the connection set-up request information to the responsible AAA server without the need for a network connection between the initially addressed AAA server and the responsible AAA server.

OBJECTS AND ADVANTAGES OF THE INVENTION

It is an object and advantage of the present invention to provide method for proxying authentication-authorization-and-accounting (AAA) messages via a network access server in a network environment comprising at least one network access server (NAS) and at least two virtual private networks (VPNs), wherein a first VPN has its own first authentication-authorization-and-accounting server (AAA server), and wherein a second VPN has its own second AAA server, comprising the steps of:

said NAS invokes said first AAA server for a user authentication-authorization-and-accounting and when said first AAA server is not responsible for the user authentication-authorization-and-accounting, said first AAA server partly steers the NAS operation and identifying a configuration for a responsible second AAA server, if this information is available and if no information is available, forcing said NAS to select or identify a configuration for the responsible second AAA server and said NAS invokes said second AAA server, based on the said configuration, and this second AAA server performs a real user authentication-authorization-and-accounting and a decisive steering of the NAS operation.

It is a further object of the invention to provide a network proxying user authentication-authorization-and-accounting messages via an NAS comprising at least one NAS and at least two VPNs, wherein a first VPN has its own first AAA server, and wherein a second VPN has its own second AAA server, wherein said at least one NAS comprises means for invoking said first AAA server for user authentication-authorization-and-accounting, wherein if said first AAA server is not responsible for the user authentication-authorization-and-accounting, said first AAA server partly steers the NAS operation by selecting a configuration to reach a responsible second AAA server, said NAS invokes said second AAA server, based on the configuration, and said second AAA server performs a real user authentication-authorization-and-accounting and a decisive steering of the NAS operation.

It is a further object of the invention to provide a network access server proxying user authentication-authorization-and-accounting messages via an NAS, comprising means for invoking a first AAA server for user authentication-authorization-and-accounting, wherein if said first AAA server is not responsible for the user authentication-authorization-and-accounting, said first AAA server partly steers the NAS operation by selecting a configuration to reach a responsible second AAA server, and said NAS comprising means for, invoking based on the configuration, a corresponding second AAA server performing a real user authentication-authorization-and-accounting and a decisive steering of the network access server operation.

It is a further object of the invention to provide a method for an NAS redirecting user authentication-authorization-and-accounting messages, wherein a first AAA server sends a configuration to invoke a second AAA server, comprising the steps of
- partly steering a network access server operation
- identifying a configuration for a responsible second AAA server, if this information is available and if no information is available, forcing said NAS to select or identify a configuration for the responsible second AAA server and
- forcing said NAS to use the configuration to reach the responsible second AAA server.

It is a further an object of the invention to provide a computer software product enabling an NAS redirecting user authentication-authorization-and-accounting messages, wherein a first AAA server sends a configuration to invoke a second AAA server by
- partly steering a network access server operation
- identifying a configuration for a responsible second AAA server, if this information is available and if no information is available, forcing said NAS to select or identify a configuration for the responsible second AAA server and
- forcing said NAS to use the configuration to reach the responsible second AAA server.

It is a further object of the invention to provide an authentication-authorization-and-accounting server proxying user authentication-authorization-and-accounting messages via an NAS comprising means for partly steering an NAS operation, identifying a configuration for a responsible second AAA server, if this information is available, and selecting the a configuration to reach another (responsible) second AAA server.

A further object of the invention is to provide a method for an authentication-authorization-and-accounting server proxying user authentication-authorization-and-accounting messages via an NAS comprising the steps of
- partly steering a network access server operation
- identifying a configuration for a responsible second AAA server, if this information is available and if no information is available, forcing said NAS to select or identify a configuration for the responsible second AAA server and
- forcing said NAS to use the configuration to reach the responsible second AM server.

Yet another object of the invention is to provide a computer software product enabling an authentication-authorization-and-accounting server proxying user authentication-authorization-and-accounting messages via an NAS by
- partly steering a network access server operation
- identifying a configuration for a responsible second AAA server, if this information is available and if no information is available, forcing said NAS to select or identify a configuration for the responsible second AAA server and
- forcing said NAS to use the configuration to reach the responsible second AAA server.

BRIEF DESCRIPTION OF THE INVENTION

Instead of having the addressed AAA server be in charge of authenticating the user and consequently steer the network access server operation, the addressed AAA server, in a first step, partly steers the network access server operation, i.e. forcing the NAS to select the right configuration to reach a responsible AAA server, while the responsible AAA server, in a second step, performs the real authentication of the user and the decisive steering of the network access server operation.

The above mentioned and many other objects and advantages of the present invention will become apparent to those of ordinary skill in the art from a consideration of the drawings and ensuing description.

DETAILED DESCRIPTION OF THE INVENTION

Those of ordinary skill in the art will realize that the following description of the present invention is illustrative only and is not intended to be in any way limiting. Other embodiments of the invention will readily suggest themselves to such skilled persons from an examination of the within disclosure.

Figure 1:
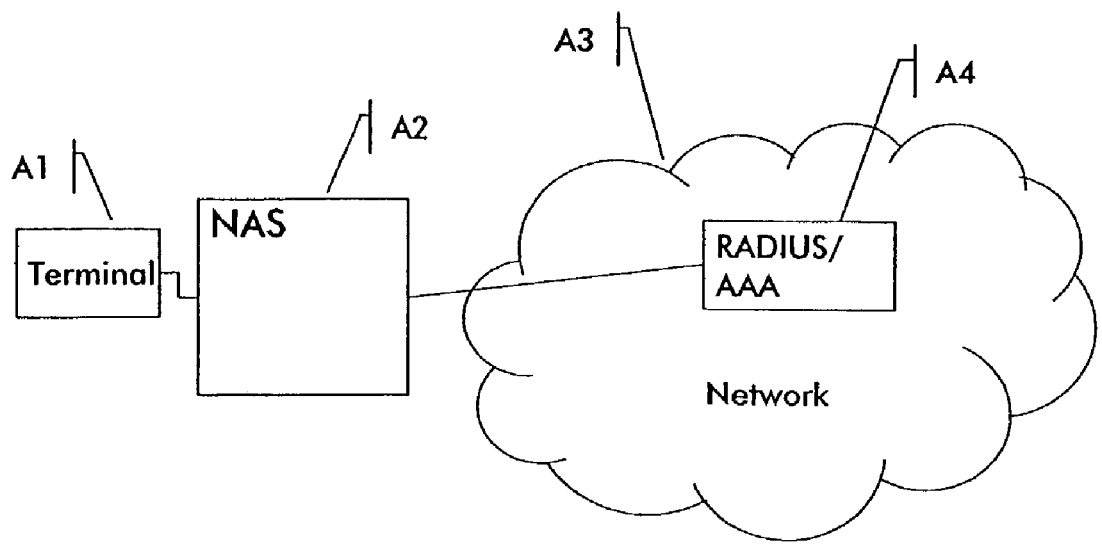
FIG. 1 is a schematic drawing of a prior art network wherein a terminal connects via a network access server and the network has its authentication-authorization-and-accounting server.

FIG. 1 shows a terminal or user client A1, a network access server (NAS) A2, a network A3 and an authentication-authorization-and-accounting server (AAA server) A4. The terminal A1 is connected with the NAS A2. The NAS A2 itself is connected with the network A3 and especially with the AAA server A4.

The picture shows the simplest network access scenario, a terminal A1 is connecting via an NAS A2 to a network A3, wherein the authentication-authorization-and-accounting is performed by an AAA server A4 controlling the NAS A2.

Figure 2:
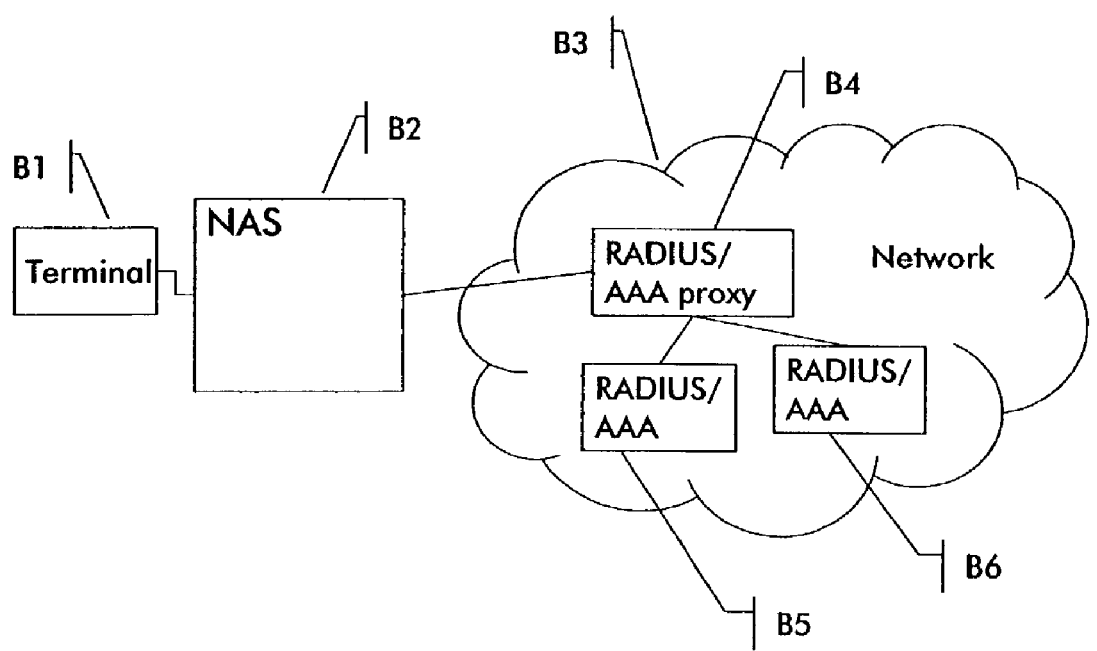
FIG. 2 is a schematic drawing of a prior art network wherein a terminal connects via a network access server and the network has a distributed (proxying) authentication-authorization-and-accounting server.

FIG. 2 shows a terminal or user client B1, an NAS B2, a network B3, a AAA proxy B4, and a first AAA server B5 and a second one B6. The terminal B1 is connected with the NAS B2. The NAS B2 itself is connected with the network A3 and especially with the AAA proxy A4. The AAA servers B5, B6 are connected to the AAA proxy B4 in the network B3.

The picture shows a network access scenario with a proxying AAA server. A terminal B1 is connecting via an NAS B2 to a network B3, wherein the AAA proxy B4 proxies the authentication-authorization-and-accounting messages, controlling the NAS B2.

Figure 3:
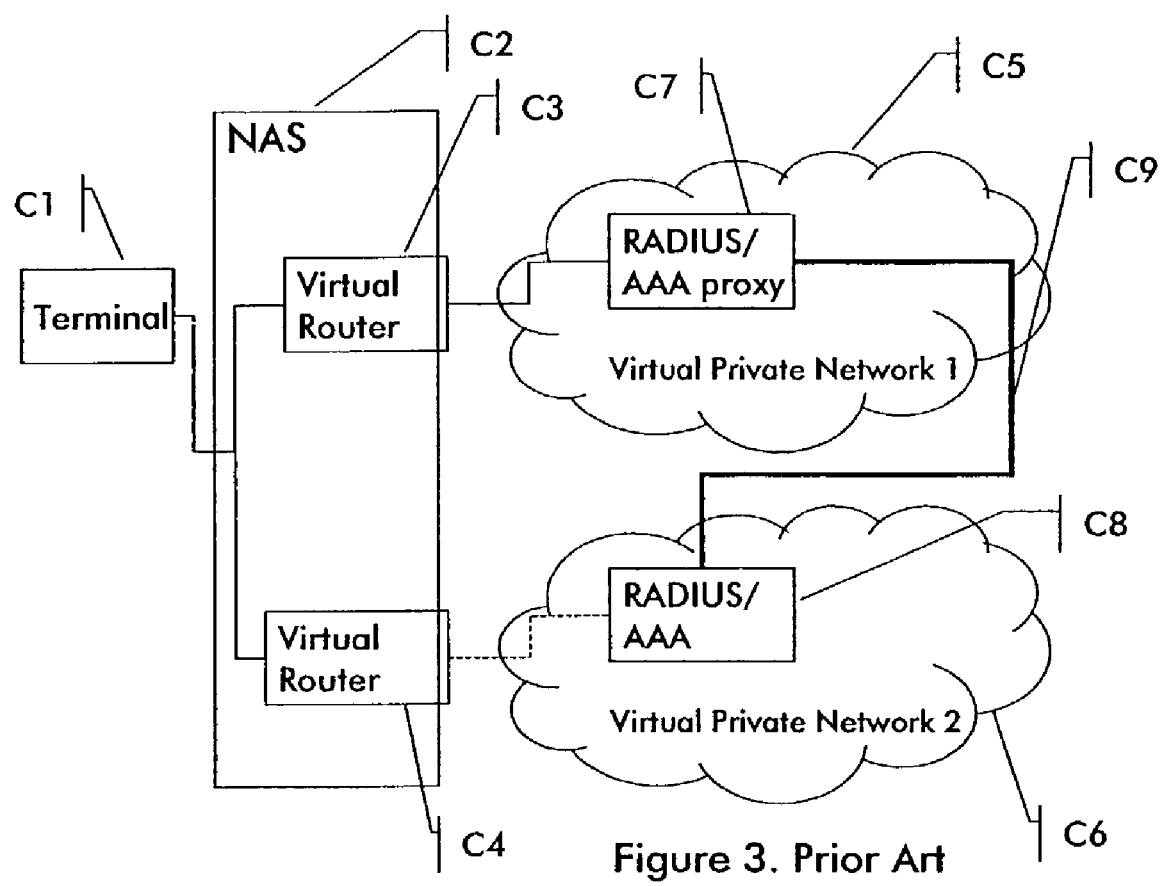
FIG. 3 is a schematic drawing according to prior art of two connected virtual private networks wherein a terminal connects via a network access server and the first private network has a proxying authentication-authorization-and-accounting server.

FIG. 3 shows a terminal or user client C1, an NAS C2 comprising two virtual routers C3,C4, two virtual private networks (VPNs) C5, C6, an AAA proxy C7, and an AAA server C8.

The terminal C1 is connected with the NAS C2 and to each virtual router C3,C4. The virtual router C3 is connected with the VPN C5 and especially with the AAA proxy C7. The virtual router C4 is connected with the VPN C6 and especially with the AAA server C8. Both VPNs C5, C6 are connected via a connection C9; especially the AAA proxy C7 and the AAA server C8 are connected via the connection C9.

The picture shows a network access scenario with a proxying AAA server, where the AAA proxying is performed by a connection C9 between two VPNs C5, C6. A terminal A1 is connecting to the VPN C6 via an NAS C2. The AAA proxy C7 contained in VPN C5 proxies the authentication-authorization-and-accounting for accessing the VPN C6, controlling the NAS C2. The AAA proxy C7 is reached over the virtual router C3 and is proxying the accounting information from the AAA server C8 via the connection C9.

Figure 4:
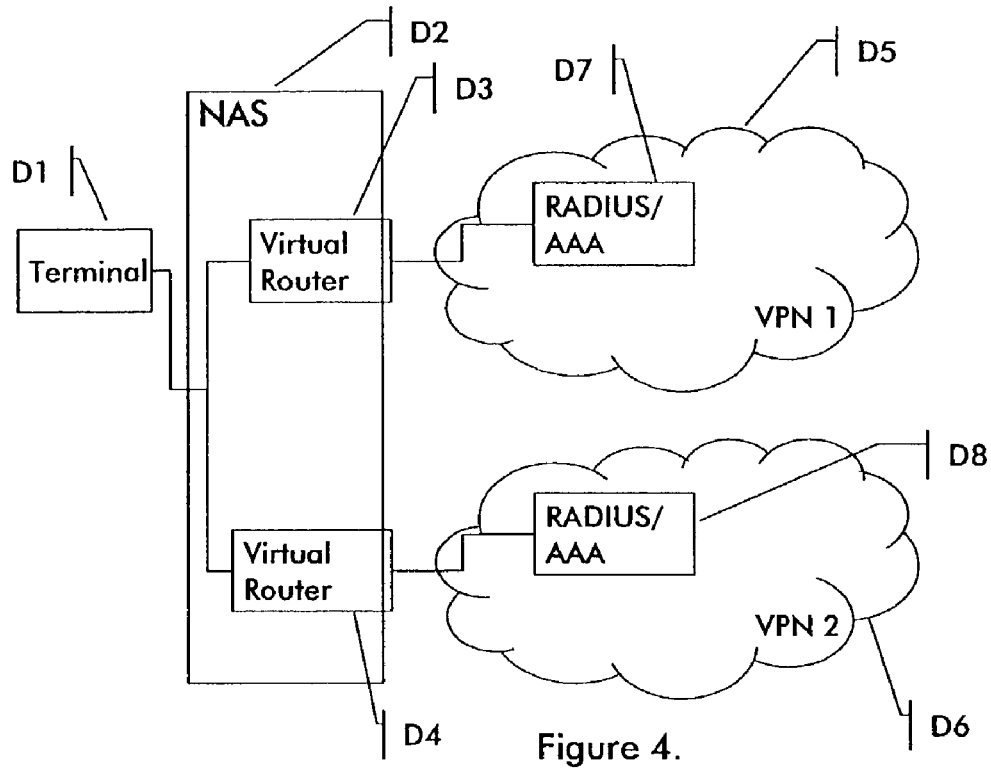
FIG. 4 is a schematic drawing of two separate (disconnected) virtual private networks wherein a terminal connects via a network access server and each private network has its authentication-authorization-and-accounting server.

FIG. 4 shows a terminal or user client D1, an NAS D2 comprising two virtual routers D3 and D4, two separate VPNs, D5 and D6, and two AAA servers, D7 in VPN D5 and D8 in VPN D6.

The terminal D1 is connected with the NAS D2 and therein to each virtual router D3, D4.

The virtual router D3 is connected with the VPN D5 and especially with the AAA server D7 of the VPN D5. The virtual router D4 is connected with the VPN D6 and especially with the AAA server C8 of the VPN D6. Both VPNs C5, C6 are separate/disconnected.

The picture shows a network access scenario where a proxying AAA server seems to be impossible due to the fact that the VPNs D5, D6 are separate/disconnected. It is an object of the invention to enable a proxying over the NAS D2.

Assume a terminal D1 is connecting to the VPN D6 via an NAS D2 and the NAS D2 invokes the AAA-server D7 for user authentication-authorization-and-accounting via the virtual router D3. But the AAA server D7 is not responsible for VPN D6. The AAA server D7 informs the NAS D2 that the NAS should use the virtual router D4 to contact the responsible AAA server D8 for authentication-authorization-and-accounting.

Figure 5:
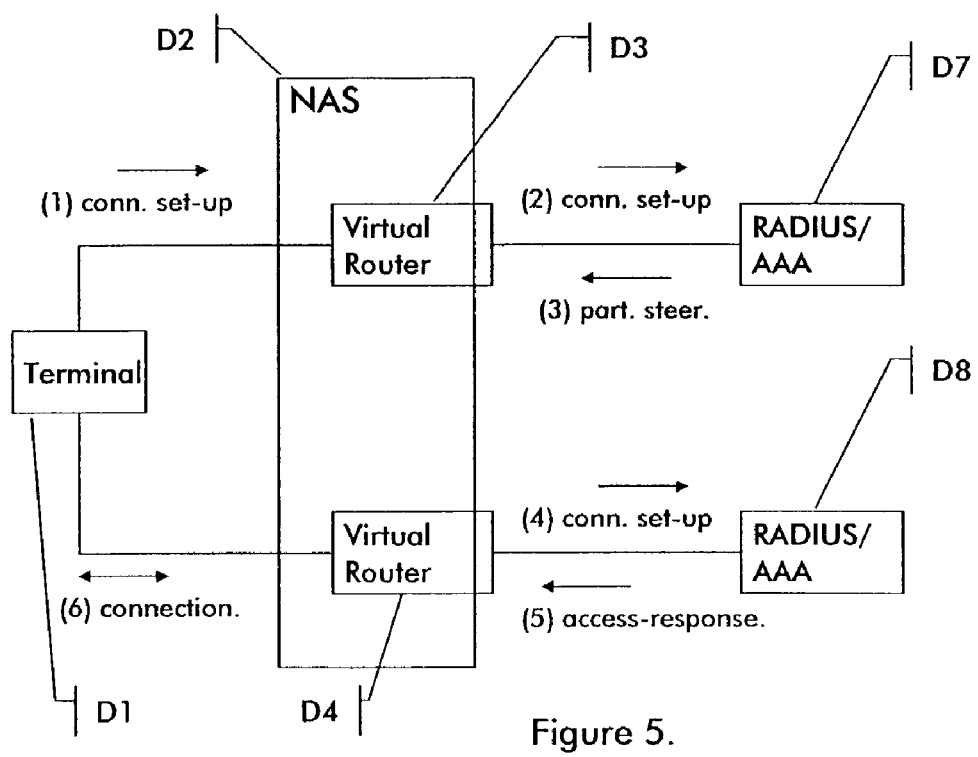
FIG. 5 is a collaboration diagram illustrating an authentication-authorization-and-accounting server invocation by showing the actions and messaging when the a terminal connects via a network access server a network.

FIG. 5 shows a collaboration diagram according to FIG. 4, consisting also of the terminal or user client D1, the NAS D2 that itself comprises the two virtual routers D3, D4, each one connected to the AAA servers D7, D8, respectively.

A connection set-up request (1) is sent from terminal D1 to the NAS D2. The NAS uses the virtual router D3 to invoke the AAA server D7 by sending the connection set-up information (2) to the AAA server D7. But in the scenario the AAA server D7 seems not to be responsible for user authentication-authorization-and-accounting. AAA server D7 only partially steer (3) the NAS D2 and provides information about what AAA server and virtual router has to be used. In the scenario the NAS D2 uses the virtual router D4 to invoke the AAA server D8 by sending the connection set-up (4) to it. The AAA server responds with an access-response (5) allowing the NAS D2 to finalize the terminal's connection (6).

In a presently preferred embodiment of the present invention are methods, an AAA server, an NAS, computer software products for authentication-authorization-and-accounting capable of having an addressed AAA server D7, D8 be in charge of authenticating the user and consequently steering the network access server operation. The addressed AAA server D7, in a first step, partly steering the network access server operation, i.e. forcing the NAS D2 to select a configuration to reach a responsible AAA server D8, while the responsible AAA server D8, in a second step, performs the real authentication of the user and the decisive steering of the network access server operation.

A user, i.e. a terminal D1, sends his connection set-up request information to an (addressed) AAA server D7, e.g. in the form VPN_USER@VPN_DOMAIN together with the VPN_PASSWORD. From this information the addressed AAA server D7 learns that it cannot itself authenticate the user if it has no corresponding subscriber information. It further knows (how to find out) that the responsible AAA server is in the VPN_DOMAIN VPN D6.

There is a responsible AAA server D8 that authenticates users in this VPN_DOMAIN VPN D6. The VPN_DOMAIN is associated with a specific virtual router D4 in the NAS D2 and the initially addressed AAA server D7 might know this information or the information could be retrieved by a distributed try and error procedure, shortly described below.

When the addressed AAA server D7 cannot authenticate the user, it then partly steers the NAS D2 in the following way: First it instructs the NAS D2 to select the (right) virtual router D4, corresponding to the VPN_DOMAIN. It mentions to the NAS D2 that authentication has not yet been finalized, so the virtual router must not allocate a user IP address yet and an accounting message must not yet be sent from the NAS D2 to the addressed AAA server D7. Then the AAA server D7 and the NAS D2 makes sure that the initial connection set-up request information is forwarded via the selected virtual router D4 to the responsible AAA server D8 in the VPN_DOMAIN, e.g. the addressed AAA server D7 can forward this information itself, via the NAS virtual routers D3, D4, trigger the NAS D2 to send the (cached) connection set-up request to the responsible AAA server D8 or instruct the user client (terminal D1) to repeat the connection set-up request, which will then be routed to the responsible AAA server D8.

The responsible AAA server D8 then receives the connection set-up request via the selected virtual router D4, e.g. in the form VPN_USER@VPN_DOMAIN together with the VPN_PASSWORD. From this information the responsible AAA server D8 learns that it can authenticate the user, e.g. by recognizing the VPN_DOMAIN. Hence the virtual router D4 to be selected is the one with which the responsible AAA server D8 is associated. The responsible AAA server will know this information.

The responsible AAA server D8 then authenticates the user in the VPN_DOMAIN and confirms the virtual router D4. The responsible AAA server D8 finalizes the steering of the NAS D2 in the following way: It instructs the NAS D2 to select the right virtual router D4 corresponding to the VPN_DOMAIN VPN D6, and it mentions to the NAS D2 that authentication has now been finalized, so the virtual router D4 will allocate, e.g. an IP address now, and an accounting message will be sent from the NAS D2 to the responsible AAA server D8 and, optionally, to the initially addressed AAA server D7 for caching etc.

After that, the connection is set up and the responsible AAA server D8 or the initially addressed AAA server D7 in case of a true proxying, remains in charge until the final accounting message that reports the connection tear down is received.

If the first AAA is not able to identify a configuration for a responsible AAA server, it might force the NAS by a default configuration, to invoke another AAA server in another virtual private network. If even a second invoked AAA server is not responsible, such a try and error game could be repeated until the correct AAA server is identified.

The addressed AAA server or even the network access server itself optionally might cache gathered information about NAS configurations.

Alternative Embodiments

Although illustrative presently preferred embodiments and applications of this invention are shown and described herein, many variations and modifications are possible, which remain within the concept, scope, and spirit of the invention, and these variations would become clear to those of skill in the art after perusal of this application.

For example, the invention can be used with any type of service invocation beside the AAA server and an NAS and need not be limited to interpret configurations of virtual routers or AAA servers. The invention, therefore, is not intended to be limited except in the spirit of the appended claims.

Alternatively any service, e.g. the domain name service, accessible via an NAS provided in a network environment according to FIG. 4 could proxying via the NAS. Similarly not only NAS could provide this proxying functionality. The inventions method is applicable for all (separated) networks that are coupled by a routing or switching device.

What is claimed is:

1. A method for proxying authentication-authorization-and-accounting (AAA) messages via a network access server, comprising:
   sending a request from a network access server (NAS) to a first authentication-authorization-and-accounting (AAA) server on a first virtual private network (VPN) connected to a first virtual router of said NAS for a user authentication-authorization-and-accounting, when said first AAA server is not responsible for the user authentication-authorization-and-accounting;
   receiving a request from said first AAA server to said NAS partially directing said NAS to identify a configuration for a responsible second AAA server, if such information is available; and
   if no such information is available, receiving a request from said first AAA server to said NAS forcing said NAS to select or identify a configuration for a responsible second AAA server on a second VPN connected to a second virtual router of said NAS; and
   sending a request from said NAS to said second AAA server, based on said configuration, to perform a real user authentication-authorization-and-accounting and a decisive steering of said NAS;
   wherein said first and second VPNs are connected only via said NAS.

2. A network proxying user authentication-authorization-and-accounting messages via an NAS, the network comprising:
   at least one NAS and at least first and second virtual private networks (VPNs);
   said first VPN having its own first AAA server and being connected to a first virtual router of a first NAS of said at least one NAS;
   said second VPN having its own second AAA server and being connected to a second virtual router of said first NAS;
   said first and second VPNs being connected only via said first NAS;
   said first NAS comprising means for invoking said first AAA server for user authentication-authorization-and-accounting;
   wherein if said first AAA server is not responsible for the user authentication-authorization-and-accounting, said first AAA server partly steers the NAS operation by selecting a configuration to reach a responsible second AAA server, said NAS invokes said second AAA server, based on the configuration, and said second AAA server performs a real user authentication-authorization-and-accounting and a decisive steering of the NAS operation.

3. A network access server (NAS) for proxying user authentication-authorization-and-accounting messages, comprising:
   a first connection via a first virtual router to a first network;
   a second connection via a second virtual router to a second network which is only connected to said first network via said first and second connections;
   means for invoking a first AAA server on said first network via said first connection to perform user authentication-authorization-and-accounting;
   wherein if said first AAA server is not responsible for the user authentication-authorization-and-accounting, said first AAA server partly steers the NAS operation by selecting a configuration to reach a responsible second AAA server; and
   means for invoking, based on the configuration, a corresponding second AAA server on said second network via said second connection to perform a real user authentication-authorization-and-accounting; and
   means for receiving and executing a decisive steering of NAS operation from said second AAA server.

4. A method for an authentication-authorization-and-accounting (AAA) server to facilitate redirecting user authentication-authorization-and-accounting messages, , the method comprising:
   partly steering a network access server (NAS) via a first network connected to a first virtual router of said NAS, to identify a configuration for a responsible second AAA server on a second network connected to a second virtual router of said NAS, if this information is available, and if no information is available, forcing said NAS to select or identify a configuration for the responsible second AAA server; and forcing said NAS to use the configuration to reach the responsible second AAA server;

wherein said first and second networks are connected only via said NAS.

5. A computer software product embodied in a computer-readable medium, including computer-executable code for enabling a network access server (NAS) to redirect user authentication-authorization-and-accounting (AAA) messages, said computer software product comprising:

code which invokes a first AAA server on a first network connected to a first virtual router of a NAS;

code which sends a configuration to invoke a second AAA server on a second network connected to a second virtual router of said NAS;

code which receives and executes a partial steering of a NAS operation;

code which identifies a configuration for a responsible second AAA server, if this information is available and if no information is available, forcing said NAS to select or identify a configuration for the responsible second AAA server; and code which forces said NAS to use the configuration to reach the responsible second AAA server;

wherein said first and second networks are connected only via said NAS.

6. An authentication-authorization-and-accounting (AAA) server proxying user (AAA) messages via a network access server (NAS) comprising:

means for partly steering a NAS via a first network connected to a first virtual router of said NAS;

means for identifying a configuration for a responsible second AAA server on a second network connected to a second virtual router of said NAS, if this information is available; and means for selecting the configuration to reach another responsible second AAA server;

wherein said first and second networks are connected only via said NAS.

7. A method for a network access server (NAS) to handle authentication and accounting messages, comprising:

sending a first request for user authentication or accounting from a NAS via a first virtual router to a first AAA server on a first network;

receiving a response from said first AAA server to said NAS, said response indicating that said first AAA server is not responsible for said user;

sending a second request for user authentication or accounting from said NAS via a second virtual router to a second AAA server on a second network; and receiving a response from said second AAA server regarding said second request for user authentication or accounting;

wherein said first and second networks are connected only via said NAS.

8. The method of claim 7, wherein said response from said first AAA server comprises information identifying said second AAA server, and said requesting of said user authentication or accounting from said second AAA server is performed based on said information identifying said second AAA server.

9. The method of claim 7, wherein said response from said first AAA server does not contain information identifying said second AAA server, and comprises direction for determining information identifying said second AAA server.

10. The method of claim 9, wherein said requesting of said user authentication or accounting from said second AAA server is performed based on said information identifying said second AAA server.

11. The method of claim 10, wherein said determining comprises:

making a first determination whether a different AAA server on a different network can be identified;

if said first determination is affirmative, making a request for said user authentication or accounting from said different AAA server;

receiving a response from said different AAA server;

making a second determination whether said response from said different AAA server contains said user authentication or accounting;

repeating the steps of claim 11 until at least one of (a) said first determination is not affirmative or (b) said second determination is affirmative.

12. The network access server of claim 3, farther comprising:

a first virtual router comprising said first connection to said first network; and a second virtual router comprising said second connection to said second network.

* * * * *

UNITED STATES PATENT AND TRADEMARK OFFICE
CERTIFICATE OF CORRECTION

PATENT NO. : 7,624,429 B2  Page 1 of 1
APPLICATION NO. : 10/440239
DATED : November 24, 2009
INVENTOR(S) : Van Ackere et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1205 days.

Signed and Sealed this

Twenty-first Day of December, 2010

David J. Kappos
*Director of the United States Patent and Trademark Office*